United States Patent [19]

Deisler et al.

[11] Patent Number: 4,902,156
[45] Date of Patent: Feb. 20, 1990

[54] MOUNTING DEVICE FOR IMAGE CYLINDERS

[75] Inventors: Manfred Deisler, Flintbek; Ralf Balzeit, Preetz; Reinhard Gesell, Schonkirchen; Bernd Lassen, Kitzeberg; Wolfgang Dinse, Kiel, all of Fed. Rep. of Germany

[73] Assignee: Dipl. Ing. Rudolf Hell GmbH, Fed. Rep. of Germany

[21] Appl. No.: 272,890
[22] PCT Filed: Feb. 18, 1988
[86] PCT No.: PCT/DE88/00084
  § 371 Date: Oct. 18, 1988
  § 102(e) Date: Oct. 18, 1988
[87] PCT Pub. No.: WO88/06389
  PCT Pub. Date: Aug. 25, 1988

[30] Foreign Application Priority Data

Feb. 21, 1987 [EP] European Pat. Off. ............ 87102480

[51] Int. Cl.$^4$ ............................................. F16D 33/06
[52] U.S. Cl. ........................................ 403/24; 403/31; 403/322; 403/330; 24/603; 358/49
[58] Field of Search ................. 403/31, 321, 322, 330, 403/24; 24/602, 603, 287; 358/47, 48, 49; 410/77, 79

[56] References Cited

U.S. PATENT DOCUMENTS

| 1,794,633 | 3/1931 | Delany | 403/322 X |
| 2,361,763 | 10/1944 | Goddard | 279/106 |
| 2,657,259 | 10/1953 | Hachenberg | 358/489 |
| 3,142,102 | 7/1964 | Saunders | 24/603 X |
| 3,738,693 | 6/1973 | Loustalet | 403/322 X |
| 4,227,825 | 10/1980 | Oesterle | 403/322 |
| 4,833,760 | 5/1989 | Sundström | 403/31 X |

OTHER PUBLICATIONS

Kosov "Mechanized Machine Tool Fixtures", *Machines and Tooling*, vol. 34, No. 9, 1963, pp. 28-31.

*Primary Examiner*—Randolph A. Reese
*Assistant Examiner*—Carol I. Bordas
*Attorney, Agent, or Firm*—Hill, Van Santen, Steadman & Simpson

[57] ABSTRACT

An apparatus is disclosed on the basis whereof the image cylinders seated in cantilevered fashion in drum scanners can be mounted in the scanner in a short time running centrally regardless of the dexterity of the operator.

This thus enables the preparation of the image cylinders (application of the images, etc.) outside of the apparatus, this leading to short standstill times of the scanner.

7 Claims, 3 Drawing Sheets

MOUNTING DEVICE FOR IMAGE CYLINDERS

The invention is directed to a mechanism for mounting image cylinders in drum scanners.

In drum scanners, the images to be scanned are consistently secured as diapositives on the outside surface of a clear, transparent cylinder, what is referred to as the image cylinder. A light source that is axially entrained in the inside of the cylinder transirradiates the image when the latter is scanned line-by-line by the interaction of rotatory motion of the cylinder and axial feed motion of the outside-guided scan element in the form of a helix having a slight slope.

The entrainment of the light source situated in the cylinder would be rather complicated if the image cylinder were seated at both sides. For the purpose of short set-up times (standstill times), it is also desirable to prepare image cylinders in alternation outside of the scanner, i.e. to glue the diapositives on with precise location and, as warranted, to also already calculate adjustment values for the scanner in advance and to then mount the cylinder prepared in this way with a correspondingly fashioned mounting device so that it runs precisely round.

The object of the present invention is to specify a mounting device for image cylinders that accepts the cylinders cantilevered and clamps them firmly and running exactly round regardless of the dexterity of the operator. Height centering and gyratory centering are thereby strictly separated from one another.

The invention achieves this with the means recited in claim 1. Advantageous developments are recited in the subclaims.

The invention shall be set forth in greater detail below with reference to FIGS. 1 through 3.

DESCRIPTION OF THE PREFERRED EMBODIMENTS

Figure 1:
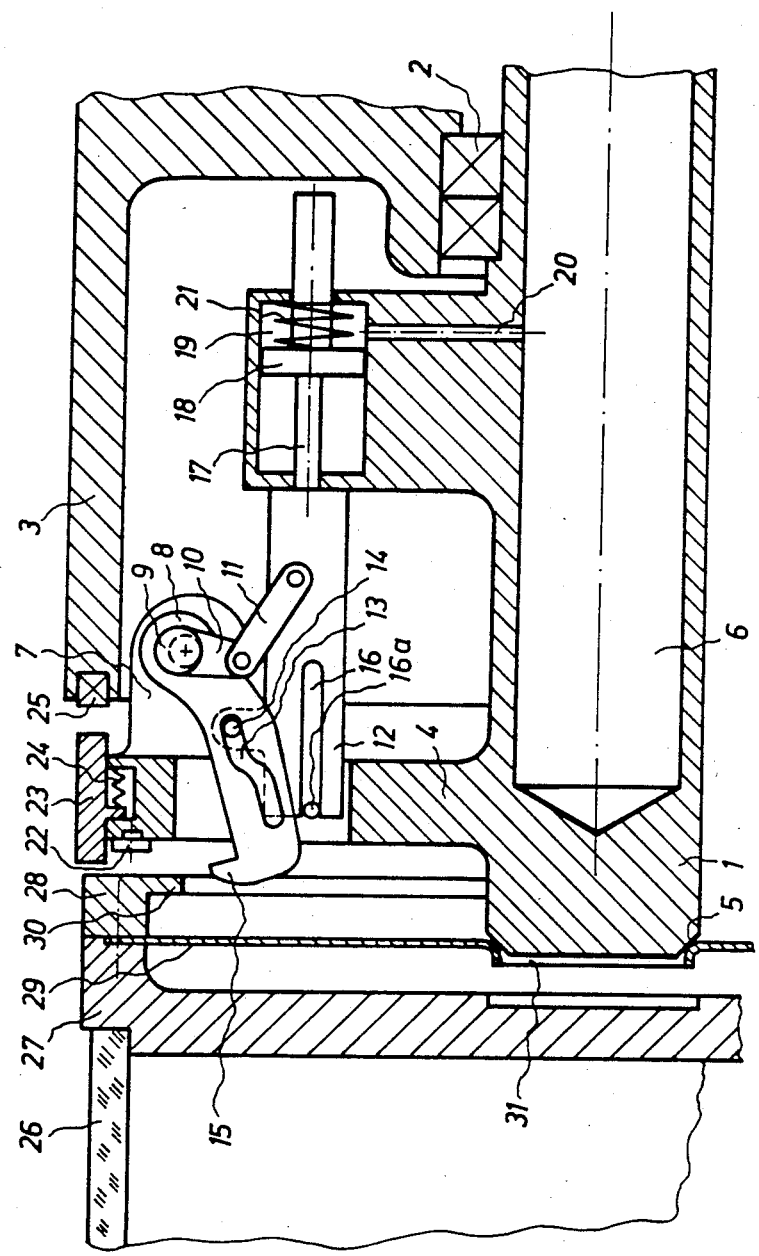
FIG. 1 is a longitudinal cross sectional view with portions in elevation of a and clamping device of the present invention with a partially joined image cylinder.

A shaft 1 that belongs to the apparatus is seated in the housing 3 of the apparatus with bearings 2 and with further bearings that are not shown here. The end of the shaft 1 is fashioned as a radial flange 4. A cone 5 that runs exactly centrally is worked in at the outermost end of the shaft butt end. The shaft 1 is bored hollow and the bore 6 can be connected to a vacuum pump via an electrically actuated valve that is not shown here. Three bearing blocks 7 that are uniformly distributed over the circumference are applied to the flange 4, clamping levers 8 being seated in these bearing blocks 7 with eccentric shafts 9.

Levers or lever arms 10 that are connected to slides 12 in articulated fashion via couplers 11 are also put in place on the eccentric shafts. The clamping levers 8 comprise link guides 13 into which pins 14 set into the slides 12 engage. The ends of the clamping levers 8 comprise hook-shaped clamping claws or jaws 15. The slides 12 are guided with slots 16 on pins 16a that are set into the flange 4. At the right-hand end, the slides 12 are connected with piston rods 17 to the pistons 18 of three pneumatic cylinders 18 attached to the shaft 1. The cylinder chambers situated at the right of the piston 18 are in communication with the bore 6 in the shaft 1 via bores 20. Compression springs 21 press the pistons into their left-hand final position when no under-pressure or vacuum is applied.

Three preferably hardened seating surfaces 22 are set into the flange 4, the end faces of these seating surfaces 22 running precisely centrally relative to the bearing of the shaft 1, this, for example, being capable of being effected by final working (grinding) after assembly.

An axially displaceable sensing ring 23 is put in place on the flange 4 at the outside, this sensing ring 23 being held in its left-hand final position by compression springs 24. As shall be shown later, it interacts with three proximity switches 25 that are arranged in the housing 3, that operate in electrically non-contacting fashion, and that are uniformly distributed over the circumference. At its right-hand end, the image cylinder 26 to be mounted comprises a flange 27 that is screwed to a tension ring 28. A relatively stiff membrane 29 is clamped between the flange 27 and the tension ring 28. The membrane 29 has a center bore 31 that is fashioned slightly nozzle-shaped. The center bore 31 proceeds exactly centrally relative to the circumference of the cylinder.

Figure 2:
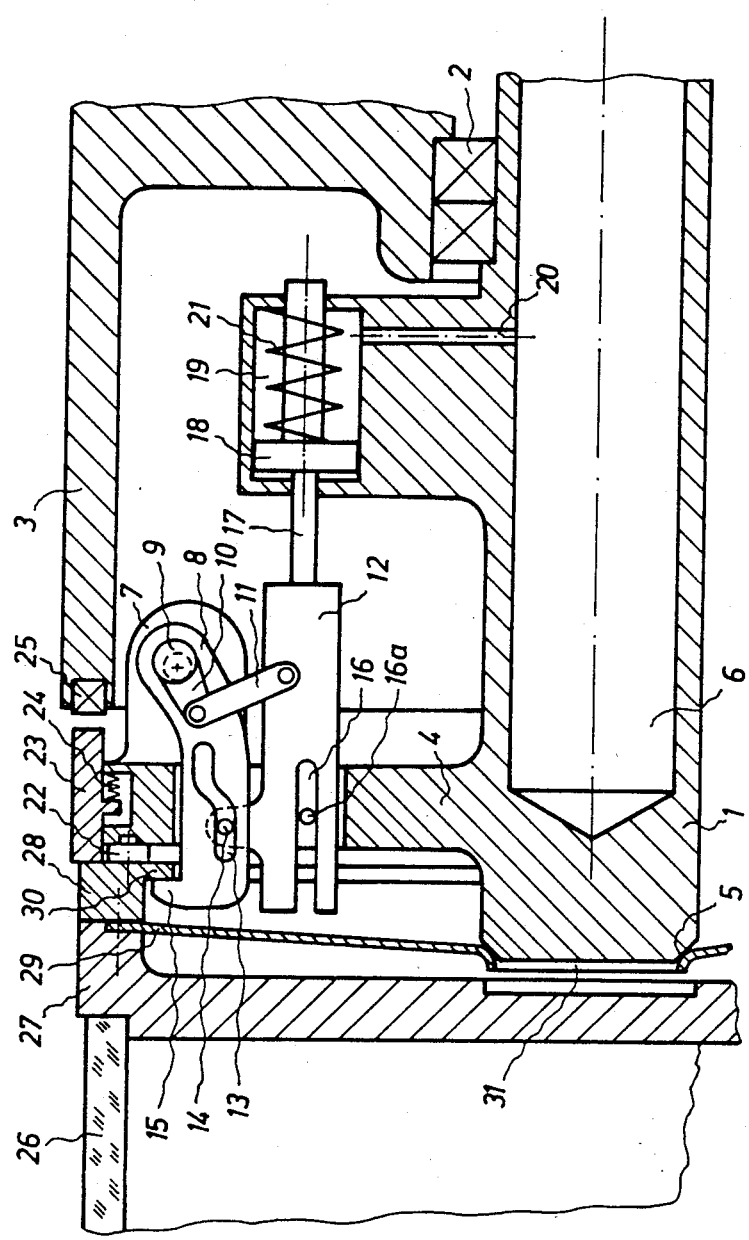
FIG. 2 is a longitudinal cross sectional view of the clamping device of FIG. 1 with a clamped image cylinder.

For clamping, the image cylinder first has the center bore 31 of the membrane 29 placed lightly against the cone 5, as shown in FIG. 1. The image cylinder 26 is thus already centered with respect to height run-out. When it is now pressed farther toward the right, then the membrane 29 deflects slightly, as shown in FIG. 2. The tension ring 28 is seated against the sensing ring 23 and pushes this toward the right against the springs 24 until the tension ring 28 lies against the three seating surfaces 22. The image cylinder 26 is thus also centered with respect to gyratory run-out. In this position, the three proximity switches 25 are activated by the sensing ring 23. Only when all three switches are switched on, i.e. only when the tension ring 28 actually lies against all three seating surfaces 22 is the bore 6 previously in communication with the vacuum pump aerated or vented via the valve (not shown) and, together with this bore 6, is the cylinder 19 aerated or vented via the bores 20. The compresion springs 21 at the right-hand side of the piston 18 press the latter and, together with it, the slides 12 toward the left. The pins 14 set into the slides thereby move in the link guides or slots 13 of the clamping levers 8 and pivot them such that their clamping claws 15 engage behind a projection 30 on the tension ring 28. The couplers 11, the levers 10, the eccentric shafts 9 as well as the link guides 13 are mated such relative to one another in terms of their interaction that the clamping claws 15 are first brought into the position shown in FIG. 2. Only then are the clamping levers 8 pulled toward the right by actuation of the eccentric shafts 9, thereby pulling the tension ring 28 firmly against the seating surfaces 21 with their clamping claws 15. This latter occurs because of the great multiplication of the eccentric shafts 9 with high forces that hold the image cylinder reliably and running centrally.

The events are executed in the reverse sequence for unmounting the cylinder. To that end, the vacuum valve is manually switched, whereby an interlocking that allows the vacuum to be turned on only when the machine is at a standstill is expedient.

Figure 3:
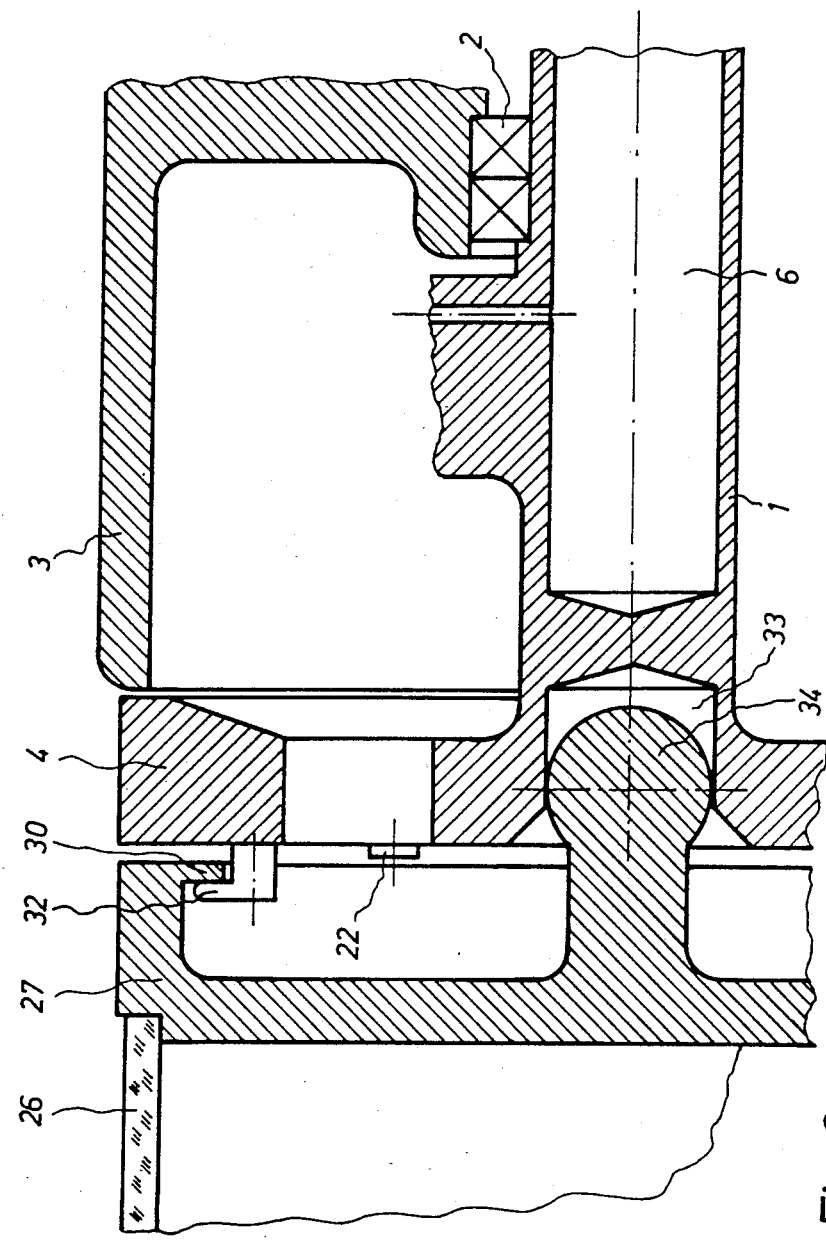
FIG. 3 is a longitudinal cross sectional view of a modification of the clamping device of the invention.

FIG. 3 shows a modification of the mounting device of the invention. The radial centering here occurs with a male member comprising a spherical, preferably hardened head 34 that is attached in the middle of the flange 27 and engages into a centering bore 33 of the shaft 1 whose surface is likewise preferably hardened. This modification also comprises a retaining hook 32 that is secured to the radial flange 4. The mechanism for actuating the clamping lever 8 corresponds to the version set forth above and is therefore not shown in FIG. 3 in order to keep the fig. surveyable. Compared to FIGS. 1 and 2, the flange in FIG. 3 is shown turned by 60°; i.e., the retaining hook 32 resides precisely between two clamping levers 8.

Control elements that are notoriously known and are therefore not set forth in greater detail see to it in operation that the clamping hook is always directed up given standstill of the machine. Accordingly, one of the seating surfaces 22 then always lies perpendicularly therebelow.

For mounting the cylinder, the operator simply suspends the cylinder 26 on the retaining hook 32 with the projection 30. The centering sphere 34 thereby engages into the centering bore 33 and the flange 27 places itself against the seating surface 22 residing therebelow due to the weight of the image cylinder. The operator thus has both hands free. The retaining hook 32 is dimensioned such that the flange 27 resides immediately in front of the two seating surfaces 22 residing at the top, being in such immediate proximity thereto that the clamping levers 8 are sure to engage behind the projection 30 upon actuation. As set forth with respect to the first embodiment, the cylinder that is already radially centered on the basis of the centering sphere 34 and centering bore 33 is thereby drawn axially firmly against all three seating surfaces 22 here and is thus also centered with respect to gyratory run-out.

The overall clamping event here is executed solely by the machine control without manual involvement of the operator. For safety reasons, however, it is recommendable to interrogate the effective final position of the clamping levers 8 or of the couplers 11 with light barriers or similar monitoring sensors and to block the machine start when all three clamping hooks have not exactly engaged.

The sensor ring 23 and the proximity switches 25 shown in the first exemplary embodiment, of course, are eliminated in this modification.

The employment of the invention is not solely limited to mounting image cylinders. On the contrary, it can be utilized anywhere that component parts having standardizable clamping flanges are to be interchangeably clamped in cantilevered fashion quickly, centrally and regardless of the dexterity of the operator.

We claim:

1. A device for central, cantilevered mounting of an image cylinder on an end of a shaft of a drum scanner, said device comprising the image cylinder having a membrane at a mounting end and a tension ring with a projection, said membrane having a centrally extending center bore; said shaft having a stub end with a cone, said shaft having a flange adjacent said stub end; seating surfaces for the tension ring of the image cylinder being arranged on said flange; a plurality of clamping levers being mounted on the flange at circumferentially distributed positions by eccentric shafts having lever arms, each clamping lever having a link-like guide and a hook-shaped end facing toward the image cylinder, each clamping lever having a slide with a pin engaged in the link-like guide, each slide being mounted for a straight line movement parallel to the axis of the shaft and being engaged by a spring urging it in one direction, each slide having a coupler hinged thereto and extending to the lever arm for the clamping lever and each slide having a piston received in a pneumatic working cylinder, means evacuating one side of said cylinder to shift said piston against said spring so that releasing the vacuum in each cylinder allows the spring to shift the piston to a position to move the clamping levers into a gripping position for gripping the projection on the tension ring.

2. A device according to claim 1, wherein each of the seating surfaces is a hardened seating surface.

3. A device according to claim 2, which includes a sensing ring being mounted for axial movement on a housing of the scanner adjacent the end stub of said shaft, said sensing ring being engaged by the tension ring and being shifted axially as the tension ring engages the seating surface, at least one proximity switch being mounted on said housing and actuating an electrically controlled pneumatic valve when the sensing ring is shifted towards the proximity switch as the tension ring is seated against the seating surface.

4. A device for a central, cantilevered mounting of an image cylinder on an end of a shaft of a drum scanner, said device comprising the image cylinder having an end flange at a mounting edge, said flange having a male member with a spherical head being centrally arranged at the flange; said end of the shaft of the scanner having a bore having an inside diameter corresponding to the diameter of the spherical head, said shaft of the scanner carrying a radial flange adjacent said end, three clamping levers uniformly distributed over the circumference of said radial flange and being mounted thereon by eccentric shafts having lever arms, three seating surfaces for engagement by a tension ring of the image cylinder being arranged on said radial flange, each of said clamping levers having a link-like guide and a hook-shaped end facing towards the image cylinder, each clamping lever having a slide movable against the force of a spring in a straight line parallel to the apparatus axis, each slide having a pin engaged in the link-like guide of the clamping lever and a coupler hinged to the slide and the lever arm for said clamping lever, each of said slides being connected to a piston disposed in a pneumatic cylinder having means to evacuate one side of the cylinder to shift the piston against the force of said spring; and a retaining hook being attached to the radial flange between two of said clamping levers, said retaining hook engaging a projection on the image cylinder for temporarily holding the image cylinder until the clamping levers engage said projection to mount the cylinder on said shaft with the head received in said bore.

5. A device according to claim 4, wherein the spherical head of the male member is a hardened head, the bore of in end of the shaft has a hardened surface, and each of the three seating surfaces has a hardened seating surface.

6. A device according to claim 5, wherein the scanning apparatus includes an arrangement of suitable sensors and drives for positioning the radial flange of the shaft with the retaining hook being positioned in a vertical upright position on standstill of said shaft.

7. Device according to claim 5, characterized in that suitable sensors are provided that block the drive of the apparatus shaft when all clamping levers are not situated in the final position for the mounted condition.

* * * * *